G. O. GOESSLING.
Compartment Dish.

No. 231,034.        Patented Aug. 10, 1880.

WITNESSES:
Henry N. Miller
C. Sedgwick

INVENTOR:
G. O. Goessling
BY
Munn & Co
ATTORNEYS.

UNITED STATES PATENT OFFICE.

GUSTAVUS O. GOESSLING, OF JERSEY CITY, NEW JERSEY.

COMPARTMENT-DISH.

SPECIFICATION forming part of Letters Patent No. 231,034, dated August 10, 1880.

Application filed December 27, 1879.

*To all whom it may concern:*

Be it known that I, GUSTAVUS OTTO GOESSLING, of Jersey City, Hudson county, and State of New Jersey, have invented a new and Improved Compartment-Dish, of which the following is a specification.

The object of my invention is to provide a new and improved dish or plate which is divided into several compartments for the different kinds of food and with an improved rim to prevent the plates from tipping when several are placed on top of each other.

The invention consists of a plate divided into several compartments for the different kinds of food and provided with an inclined rim, the inner edge of which is formed by a narrow horizontal ledge, upon which the lower annular ridge of the following plate rests when the several plates are placed on top of each other, to prevent the slipping of the same.

Figure 1:
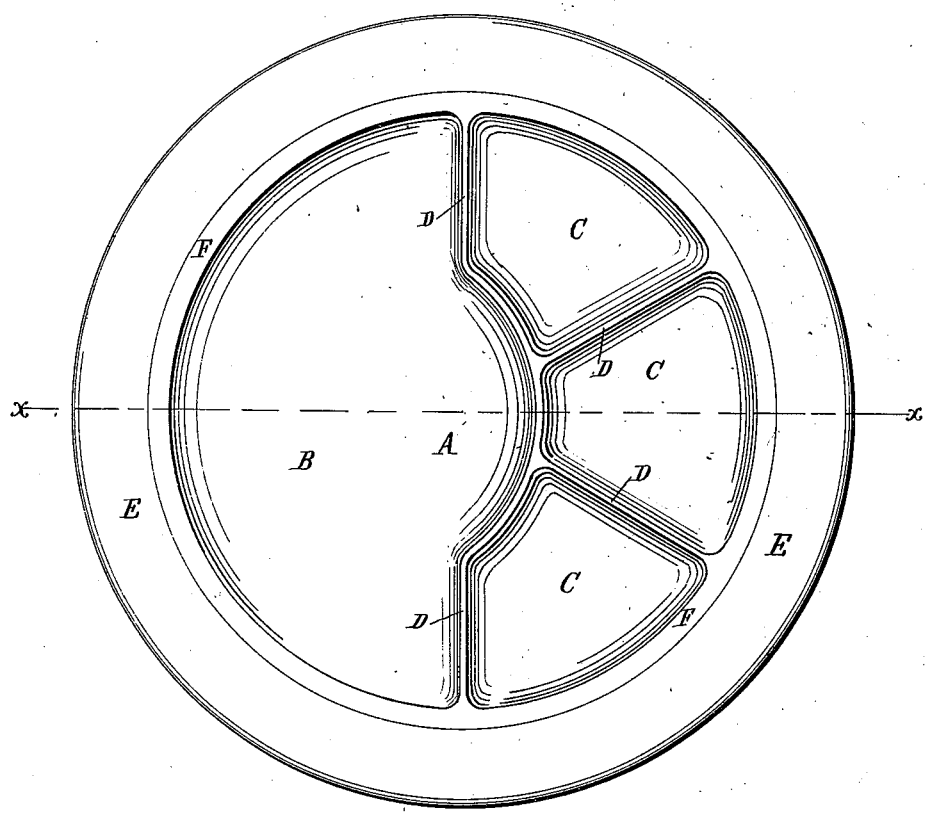
Figure 2:
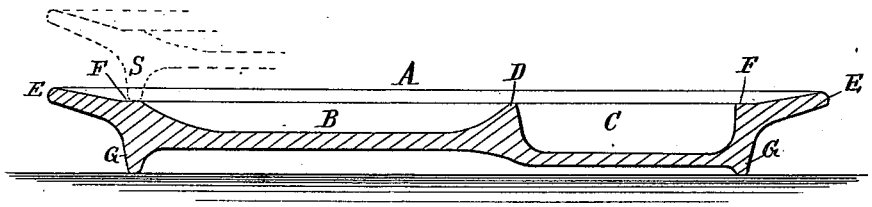

In the accompanying drawings, Figure 1 represents a plan view of my improved plate; and Fig. 2 represents a cross-sectional elevation of the same on the line $x\,x$, Fig. 1.

Similar letters of reference indicate corresponding parts.

A plate, A, is divided into a series of compartments, B and C C C, by means of the ridges D D, which are to be made as thin as the material will allow, provided they have sufficient strength to stand the ordinary handling. All angles are to be rounded, so that all corners where dirt might lodge are avoided.

The compartment B will preferably be made larger than the compartments C C, and should also be made shallower than the other compartments.

To avoid the use of an undue quantity of material the thickness of the bottom of the plate can be arranged as shown in the section Fig. 2, whereby the shallow compartment B and the deep compartments both have bottoms of the same thickness. However, all compartments may have the same depth and the under side of the plate may be smooth, the thickness of the bottom of the several compartments varying with the depth of the same.

As plates provided with compartments as described above are very liable to slip, shift, and tumble down when several are placed on top of each other, I have arranged a horizontal ledge, F, along the inner edge of the rim E, and upon this ledge F the lower ridge, G, of the next plate rests, as shown in dotted lines in Fig. 2.

As soon as the upper plate is moved the ridge E will encounter the inclined part of the rim, which prevents all further movement.

Any number of these plates provided with the rim first described can be placed on top of each other, will stand firm, and will not be thrown over by any small shock or jar.

The plates can have any desired size or shape, and can be divided into any desired number of compartments.

My invention is also applicable to any other kind of dishes.

The plate can be made of any desired material and in any desired manner.

Having thus described my invention, I claim as new and desire to secure by Letters Patent—

A compartment-dish having the inwardly-inclined rim E and horizontal anti-slip ledge F, constructed and arranged as shown and described.

GUSTAVUS O. GOESSLING.

Witnesses:
 OSCAR F. GUNZ,
 C. SEDGWICK.